A. HARRIS.
APPARATUS FOR TESTING METERS.
No. 185,319. Patented Dec. 12, 1876.
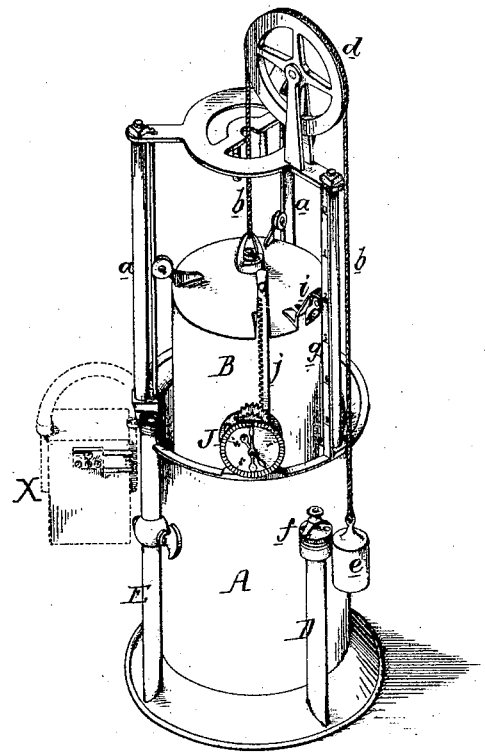

UNITED STATES PATENT OFFICE.

ANDREW HARRIS, OF PHILADELPHIA, PENNSYLVANIA, ASSIGNOR TO HIMSELF AND JOHN J. GRIFFIN, OF SAME PLACE.

IMPROVEMENT IN APPARATUS FOR TESTING METERS.

Specification forming part of Letters Patent No. 185,319, dated December 12, 1876; application filed November 2, 1876.

*To all whom it may concern:*

Be it known that I, ANDREW HARRIS, of Philadelphia, Pennsylvania, have invented a new and useful Improvement in Apparatus for Testing Meters, of which the following is a specification:

The object of my invention is to so construct an apparatus for proving meters that the proving operation can be effected much more rapidly and accurately than with the devices at present in use; and this object I attain in the manner which I will now proceed to describe, reference being had to the accompanying drawing, the figure in which represents a perspective view of my improved device for testing meters.

In order that my invention may be more fully understood I will in the outset describe the usual devices by which the testing of a meter is effected.

A is a cylindrical casing, having a supply of water which reaches a definite altitude, and within this casing is arranged a holder, B, consisting of an inverted vessel, the lower open end of which is submerged in the water within the casing A. This holder B is suitably guided, and to its top is attached one end of a cord, $b$, which passes over a pulley, $d$, and is furnished at the opposite end with a weight, $e$, slightly less than the weight of the holder.

When the holder B is elevated by the downward pulling of the cord $b$, air or gas can freely enter the interior of the said holder through a pipe, D, from which it cannot escape, owing to a check-valve, $f$. The only avenue of escape for the air or gas within the holder B is through a valved pipe, E, which is connected, by means of a flexible tube or other means, with the inlet-pipe of the meter to be tested.

The holder B is very accurately constructed, and contains, when fully elevated, a certain determinate number of cubic feet, generally five, and at one side of the casing A is usually placed a vertical graduated scale, $g$, while on the holder is arranged a pointer, $i$, adapted to this scale.

The operation of this device is as follows: The holder B is first drawn up so as to contain its full quantity of air or gas, the pointer $i$ then standing at the zero-mark on the scale $g$. The valve in the pipe E is then opened, and the holder descends by its own gravity, thereby forcing the air or gas which it contains through the pipe E and flexible tube into the meter. As the air or gas passes into the meter X (shown by dotted lines) the operator compares the record of the dial on the same with the position of the pointer $i$ on the scale $g$, in order to determine the accuracy of the registering devices of the meter. It is here that the pointer and scale prove to be objectionable, for although the dials of the meter demand very close attention on the part of the operator, he cannot make a proper and accurate examination of the pointer and scale at any time without directing his eyes entirely from the dial of the meter, while at the beginning of the operation he is even compelled to rise in order to properly examine the figures on the scale. Another objection is, that the distance on the scale is limited to the extent of movement of the holder B, so that the graduations are necessarily fine and difficult to discern with accuracy.

These objections I overcome by arranging upon the casing A a dial, J, having a suitable pointer or pointers, operated in the present instance by means of a rack, $j$, secured to the holder B through the medium of a suitable train of wheels. I graduate the dial J into a number of segments, representing, preferably, the capacity of the holder B in feet, and I prefer to use two pointers, one of which makes a complete revolution of the dial while the other is passing from one graduation to another.

By this means not only can the dial of the meter and the dial J be brought into such close proximity that their comparison will be facilitated, but the testing is much more accurate, owing to the greater distance traversed by the pointer, as well as by the check which one pointer has upon the other.

It will be evident that by increasing the size of the dial, or the arrangement of the gearing, still greater accuracy may be obtained.

I claim as my invention—

The combination, substantially as described, of the holder B of a meter-testing machine with a dial, J, and a pointer or pointers operated by the holder through the medium of suitable mechanism.

In testimony whereof I have signed my name to this specification in the presence of two subscribing witnesses.

ANDREW HARRIS.

Witnesses:
HERMANN MOESSNER,
HARRY SMITH.